United States Patent [19]

Hayashi

[11] Patent Number: 4,570,945

[45] Date of Patent: Feb. 18, 1986

[54] PISTON RING HAVING SHAPE OF AN ELLIPSE OR AN ELONGATED CIRCLE

[75] Inventor: Yoshimasa Hayashi, Kamakura, Japan

[73] Assignee: Nissan Motor Co., Ltd., Yokohama, Japan

[21] Appl. No.: 494,646

[22] Filed: May 16, 1983

[30] Foreign Application Priority Data

May 20, 1982 [JP] Japan .................................. 57-85550
May 22, 1982 [JP] Japan .................................. 57-86966

[51] Int. Cl.$^4$ ........................................... F16J 15/32
[52] U.S. Cl. .................... 277/197; 277/217; 277/220; 92/177
[58] Field of Search ................... 92/177, 202, 233; 277/136, 137, 178, 197, 217, 195, 199, 220; 123/193 P

[56] References Cited

U.S. PATENT DOCUMENTS

| | | |
|---|---|---|
| 768,136 | 8/1904 | Murphy ............................. 277/137 |
| 1,696,424 | 12/1928 | Thompson . |
| 2,073,500 | 3/1937 | Sopp ................................. 309/24 |
| 2,409,555 | 10/1946 | Gadoux et al. ..................... 92/177 |
| 2,420,921 | 5/1947 | Waldes ............................. 85/8.5 |
| 2,459,642 | 1/1949 | Hamilton .......................... 309/28 |
| 2,531,296 | 11/1950 | Rodoliakis et al. ................ 309/29 |
| 2,766,085 | 10/1956 | Muller .............................. 277/217 |
| 3,346,252 | 10/1967 | Saylor .............................. 277/137 |
| 3,391,943 | 7/1968 | Riley ................................ 277/137 |
| 3,738,669 | 6/1973 | Andersen et al. ................. 277/199 |
| 4,256,067 | 3/1981 | Fukui ................................ 92/177 |

FOREIGN PATENT DOCUMENTS

| | | |
|---|---|---|
| 581266 | 7/1933 | Fed. Rep. of Germany . |
| 3024898 | 1/1982 | Fed. Rep. of Germany . |
| 2076740 | 10/1971 | France . |
| 54-161409 | 4/1979 | Japan . |
| 54-161410 | 11/1979 | Japan . |

Primary Examiner—Robert E. Garrett
Assistant Examiner—John M. Husar
Attorney, Agent, or Firm—Schwartz, Jeffery, Schwaab, Mack, Blumenthal & Evans

[57] ABSTRACT

A piston ring for an internal combustion engine having a piston and a cylinder of an elliptical or oblong circular cross-sectional shape is divided into two or more segments which are connected end to end in a ring. Each of the end-to-end joints between the neighboring segments is so designed as to provide an adequate surface pressure of the piston ring against the cylinder wall when installed in a cylinder. In one embodiment, the piston ring comprises two arc segments each of which has two inward projections projecting from both ends of the segment, respectively. In the installed state, the two inward projections of one arc segment abut against the inward projections of the other segment, respectively, in such a manner that an abutting pair of the inward projections at each joint produce a force which tends to increase a gap clearance between the ends of the segments. In another embodiment, the piston ring comprises two arc segments and two rectilinear segments disposed, in parallel with each other, between the two arc segments to form an oblong circular ring shape. In the installed state, both ends of each arc segment is compressed between the two rectilinear segments so that the two arc segments push the rectilinear segments outwardly so as to increase the distance between the rectilinear segments.

11 Claims, 9 Drawing Figures

PISTON RING HAVING SHAPE OF AN ELLIPSE OR AN ELONGATED CIRCLE

BACKGROUND OF THE INVENTION

The present invention relates to a piston ring for use in an internal combustion engine having a piston and a cylinder whose cross sectional shapes are an ellipse or an oblong circle.

In one type of internal combustion engine, engine cylinders and pistons are formed into an elliptical or elongated circular shape in cross section with the intention of reducing the total length of a multi-cylinder engine and increasing the opening areas of intake valves and exhaust valves. Japanese utility model provisional (un-examined) publication Sho No. 54-161410 discloses a piston ring for internal combustion engines of this kind. This piston ring is in a single piece and has a ring gap joint near the minor axis of the elliptical ring shape. This piston ring is mounted around a piston by broadening the ring gap so wide that it is often damaged or plastically deformed. Furthermore, this piston ring can not provide sufficient pressure against the cylinder wall at the portions of a rectilinear shape or a gradual curve near the ends of the minor axis.

SUMMARY OF THE INVENTION

It is an object of the present invention to provide an elliptical or oblong circular piston ring which comprises two or more segments connected end to end in a ring.

It is another object of the present invention to provide an elliptical or oblong circular piston ring which comprises two or more segments connected end to end in a ring at two or more ring gap joints which are designed to expand the piston ring radially outwardly when installed in a cylinder so as to provide an adequate surface pressure against the cylinder wall.

According to one aspect of the present invention, an elliptical piston ring for an internal combustion engine having a piston and a cylinder of an elliptical cross-sectional shape comprises first and second arc segments. The first and second arc segments are capable of forming an elliptical ring shape in a constrained state in which one end of said first segment is set to one end of said second segment and the other end of said first segment is set to the other end of said second segment. Each end of said first and second segments has an inward projection. In the constrained state, one inward projection of the first segment and one inward projection of the second segment abut against and push each other, and the other inward projection of the first segment and the other inward projection of the second segment abut against and push each other so as to urge the first and second segments to move apart from each other.

Generally, the elliptical ring shape formed by the first and second arc segments has a major axis with respect to which the elliptical ring shape is symmetrical, and a minor axis with respect to which the elliptical ring shape is symmetrical. The first and second arc segments are at least approximately symmetrical in the constrained state with respect to the minor axis. Preferably, both the ends of each of the first and second arc segments are spaced wider apart in a free state than in the constrained state.

According to another aspect of the present invention, an oblong circular piston ring for an internal combustion engine having a piston and a cylinder of an oblong circular cross-sectional shape comprises first and second arc segments and third and fourth straight segments. The first, second, third and fourth segments are capable of being put in a constrained state in which the first, second, third and fourth segments are arranged end to end in a ring to form an oblong circular ring shape. The third and fourth straight segments are placed in parallel with each other and interposed between the first and second arc segments opening toward each other in the constrained state. Each end of the first and second arc segments has an underlying portion, and each end of the third and fourth straight segments has an overlying portion. Both ends of each of the first and second arc segments are spaced wider apart in a free state than in the constrained state. Each of the underlying portions of the first and second arc segments is placed under the overlying portion of the neighboring end of the third and fourth straight segments in the constrained state so that the underlying portion on the inner side abuts against the neighboring overlying portion on the outer side. Generally, the oblong circular shape formed by the first, second, third and fourth segments has a major axis with respect to which the oblong circular ring shape is symmetrical, and a minor axis which is shorter than the major axis and with respect to which the oblong circular ring shape is symmetrical.

DETAILED DESCRIPTION OF THE INVENTION

Figure 1:
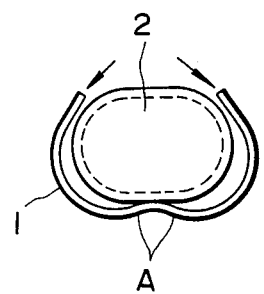
FIGS. 1 and 2 are illustrations showing the way a conventional single-piece piston ring is mounted around a piston.
Figure 2:
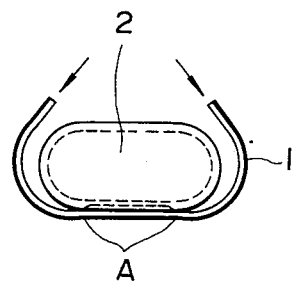

FIG. 1 shows a conventional type piston ring having the shape of an ellipse, and FIG. 2 a conventional type piston ring having the shape of an elongated circle. These piston rings 1 are mounted around pistons 2 by widening their ring gaps, as shown in FIGS. 1 and 2. In this case, excessive stresses are localized concentratedly at portions A between right and left arc portions and a central rectilinear or gradual curvilinear portion. As a result, the piston rings are often broken, or plastically deformed by stresses exceeding the elastic limit. Besides, these piston rings are unsatisfactory in sealing effectiveness because these piston rings can not provide enough surface pressure against the cylinder wall at the central rectilinear or gradual curvilinear portions.

Figure 3:
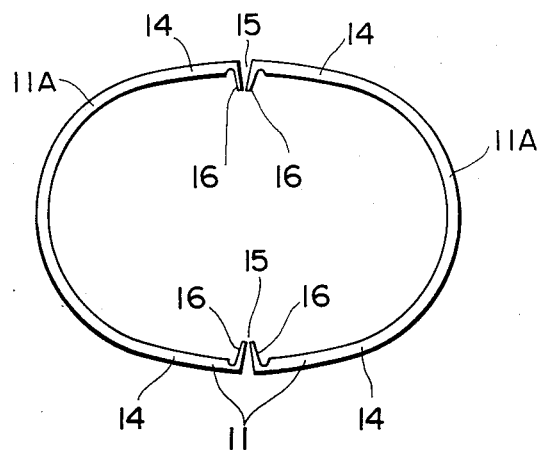
FIG. 3 is a plan view showing a piston ring according to the present invention in a free state.
Figure 4:
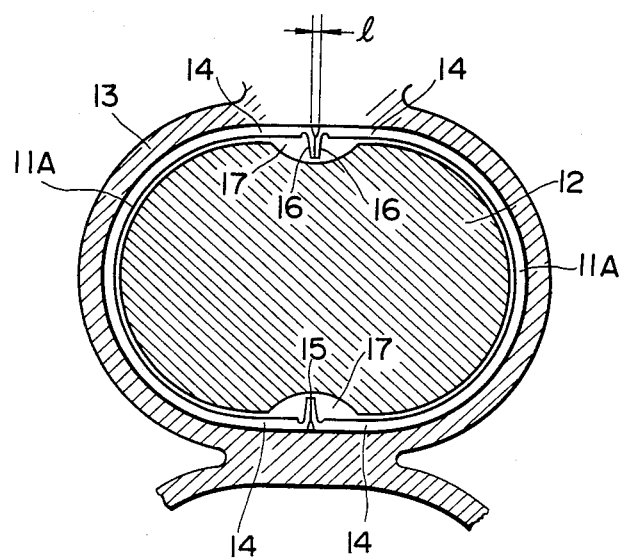
FIG. 4 is a cross sectional view of a cylinder in which the piston ring of FIG. 3 is installed.

FIG. 3 shows a piston ring 11 according to one aspect of the present invention. FIG. 4 shows the piston ring 11 fitted around a piston 12 having an elongated-circular cross section in a cylinder 13. The piston ring 11 is divided into right and left half arc segments 11A by a center line extending along the minor axis of the ring shape. Each of the half segments 11A has the shape of the letter "U" approximately. In a free state, the space between two rectilinear portions 14 of each of the half segments becomes slightly wider toward the ends of the segment, as shown in FIG. 3. When mounted in the cylinder 13, the rectilinear portions 14 are bent inwardly, so that the rectilinear portions 14 pushes the cylinder wall with sufficient pressure in the directions parallel with the minor axis of the ring shape. The piston ring 11 has two ring gap joints 15 each of which is formed between one end of one half segment and one end of the other half segment. Each end of the right and left segments 11A has an inward projection 16 which projects inwardly from the segment end and has elasticity. When the right and left segments are fitted around the piston 12 and confined in the cylinder 13, the inward projection of the right segment and the inward projection of the left segment in each of the ring gap joints are compressed against each other at the innermost regions so that the right and left segments are urged in the opposite directions along the major axis. Thus, the inward projections 16 try to expand the piston ring in the directions of the major axis and provide a sufficient surface pressure against the cylinder wall in the directions of the major axis. Each of the ring gap joints 15 has a ring gap clearance l formed between outer edges of the confronting ends of the right and left segments. Each of the ring gap clearances l is about 1/400 as long as the major axis of the piston ring 11, and serves to allow thermal expansion of the piston ring. The ring groove of the piston 12 for receiving the piston ring 11 is formed with depressions 17 each of which receives an abutting pair of the inward projections of the piston ring.

This piston ring 11 can be mounted around the piston 12 without widening the segments 11A too much, so that the afore-mentioned undesired effects of the stress concentration can be avoided. This piston ring can provide both the force expanding the piston ring along the major axis and the force expanding the piston ring along the minor axis, so that a satisfactory surface pressure against the cylinder wall can be obtained over the entire circumference.

Figure 5:
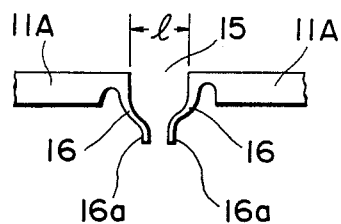
FIG. 5 is a plan view showing a portion of a piston ring of a modified design according to the present invention.

FIG. 5 shows a modification of the piston ring 11 shown in FIG. 4. In this design, each of the inward projections 16 extends curvedly from the base, and has a forward end portion 16a which is approximately in parallel with the forward end portion of the confronting inward projection. This design can provide the intended expanding forces steadily even if the ring gap clearance between the ends of the segments 11A fluctuates slightly, so that this piston ring can absorb wear of the cylinder 13 and dimentional errors.

Figure 6:
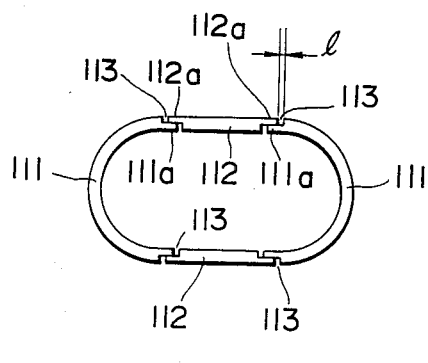
FIG. 6 is a plan view of a piston ring of another embodiment according to the present invention in the installed state.
Figure 7:
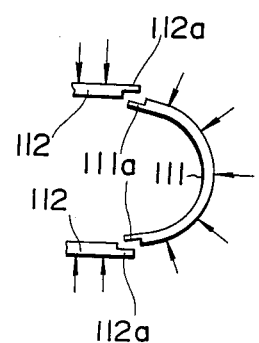
FIG. 7 is a plan view showing a portion of the piston ring of FIG. 6 in a free state.

FIGS. 6 and 7 show another embodiment of the present invention. FIG. 6 shows a state in which the piston ring is fitted around a piston in a cylinder. The piston ring of this embodiment consists of a pair of right and left arc segments 111 which are approximately semi-circular, and a pair of rectilinear segments 112 located between the right and left arc segments 111. The distance between both ends of each arc segment 111 is wider in a free state shown in FIG. 7 than in the mounted state shown in FIG. 6. In the mounted state, each arc segment 111 is disposed under compression within the cylinder with both ends kept closer, so that sufficient surface pressure against the cylinder wall can be obtained. This piston ring has four ring gap joints 113. Each end of the right and left arc segments 111 has a thin portion 111a having a thickness approximately half as much as the radial thickness of the remaining portion. Each end of the rectilinear segments 112 has a thin portion 112a having a thickness approximately half as much as the thickness of the remaining portion. At each ring gap joint, the thin portion 112a of the rectilinear segment is lapped over the thin portion 111a of the arc segment 111 so that the thin portion 111a is on the inner side and the thin portion 112a is on the outer side. In the installed state, the rectilinear segments 112 are pushed against the cylinder wall through the thus arranged ring gap joints by the expanding forces of the arc segments 111, so that a sufficient surface pressure can be obtained. At each of the ring gap joints, the thin portion 111a of the arc segment 111 and the thin portion of the rectilinear segment 112 are kept in tight contact with each other, so that a good sealing effect can be obtained. Each of the ring gap joints 113 is provided with a gap clearance l which is about 1/400 to about 1/200 as long as the major axis of the piston ring in order to compensate thermal expansion of the piston ring.

Figure 8:
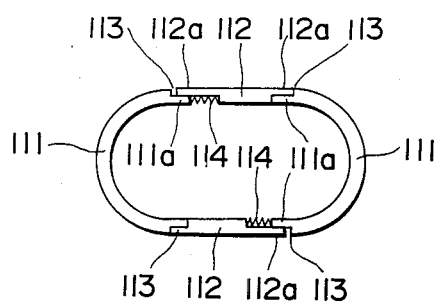
FIG. 8 is a plan view showing a modified version of the piston ring of FIG. 6.

FIG. 8 shows a modification of the piston ring shown in FIGS. 6 and 7. In this piston ring, there are further provided at the ring gap joints, springs 114 for exerting an expanding force along the direction of the major axis of the piston ring. With these springs 114, a surface pressure against the cylinder wall in the directions of the major axis of the piston ring can be increased.

Figure 9:
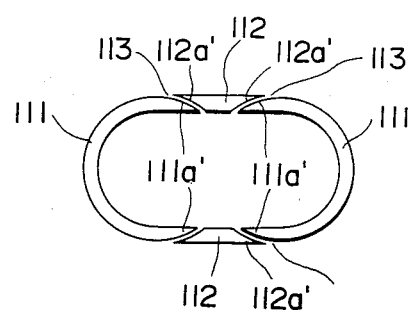
FIG. 9 is a plan view showing a piston ring of another embodiment of the present invention.

FIG. 9 shows another embodiment. In this embodiment, each end of the right and left arc segments 111 has a tapered portion 111a', and each end of the rectilinear segments has a tapered portion 112a'. At each of the ring gap joints, the tapered portion 111a' of the arc segment 111 is disposed under the tapered portion 112a' of the rectilinear segment 112, so that the tapered portion 111a' is on the inner side and the tapered portion 112a' is on the outer side. In this piston ring, the expanding forces of the arc segments provide components which act along both directions of the major axis of the piston ring in the same manner as the springs in FIG. 8. Thus, sufficient surface pressure against the cylinder wall in the directions of the major axis can be obtained.

What is claimed is:

1. A piston ring for an internal combustion engine, said piston ring being metallic and having an essentially elliptical shape, said piston ring further comprising a plurality of segments arranged in end-to-end manner, and including at least first and second arc segments, wherein each end of said first and second arc segments comprises a bendable projection which bends to exert a force against the end of a neighboring segment, said force tending to cause said first and second arc segments to move apart from each other.

2. A piston ring as claimed in claim 1, wherein said first and second arc segments are capable of forming an elliptical ring shape in a constrained state in which state one end of said first segment is set to one end of said second segment and the other end of said first segment is set to the other end of said second segment, each of said bendable projections being an inward projection which projects inwardly within the inner periphery of the elliptical ring shape in the constrained state, one inward projection of said first segment and one inward projection of said second segment abutting against and pushing each other, and the other inward projection of said first segment and the other inward projection of said second segment abutting against and pushing each other so as to urge said first and second segments to move apart from each other in said constrained state.

3. An elliptical piston ring according to claim 2, wherein said elliptical ring shape formed by said first and second segments has a major axis with respect to which said elliptical ring shape is symmetrical and a minor axis with respect to which said elliptical ring shape is symmetrical, said first and second segments being at least approximately symmetrical in said constrained state with respect to said minor axis.

4. An elliptical piston ring according to claim 3, wherein both the ends of each of said first and second segments are spaced wider apart in a free state than in said constrained state.

5. An elliptical piston ring according to claim 4, wherein each end of said first segment is spaced at a limited distance apart from the neighboring end of said second segment in said constrained state, at least at unelevated temperatures while each inward projection of said first segment is kept in contact with the neighboring inward projection of said second segment.

6. An elliptical piston ring according to claim 5, wherein said limited distance is about 1/400 as long as the major axis of the piston ring.

7. An elliptical piston ring according to claim 5, wherein each of said inward projections of said first segment in the free state extends from each respective end of said first segment along a line which, if extended, intersects the line along which the other inward projection of said first segment extends at an intersecting point which lies outside an area bounded by said first segment and a line joining both the ends of said first segment, and each of said inward projections of said second segment in the free state extends in the same manner.

8. An elliptical piston ring according to claim 5, wherein each of said inward projections of said first and second segments has a curved portion extending from each respective end of said segments and a straight portion which extends inwardly from said curved portion and is in parallel with said minor axis in said constrained state, each of said straight portions of said first segment being in contact with the neighboring straight portion of said second segment in said constrained state.

9. An elliptical piston ring according to claim 3, wherein said elliptical ring shape is an ellipse.

10. An elliptical piston ring according to claim 3, wherein said elliptical ring shape is an elongated circle having two rectilinear portions which are parallel with said major axis.

11. An internal combustion engine comprising:
a cylinder having an elliptical cross section,
a piston which has an elliptical cross section and is contained in said cylinder, said piston having a piston ring groove of an elliptical shape, and
an elliptical piston ring fitted in said ring groove of said piston, said piston ring comprising first and second arc segments connected end to end to form an elliptical ring shape, each end of said first and second segments having a bendable inward projection which abuts against and pushes the bendable inward projection of the neighboring end of the other segment, said ring groove of said piston being formed with two depressions each of which accommodates a contacting pair of said bendable inward projections of said first and second segments.

* * * * *